US008130247B2

(12) United States Patent
Fukuda

(10) Patent No.: US 8,130,247 B2
(45) Date of Patent: *Mar. 6, 2012

(54) IMAGE FORMING APPARATUS HAVING FIRST AND SECOND FRAMES AND A CONNECTING MEMBER COUPLED THERETO FOR FACILITATING MULTIPLE STAGES OF MOVEMENT

(75) Inventor: Masahiro Fukuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/095,439

(22) Filed: Apr. 27, 2011

(65) Prior Publication Data
US 2011/0211884 A1 Sep. 1, 2011

Related U.S. Application Data

(63) Continuation of application No. 11/360,282, filed on Feb. 23, 2006, now Pat. No. 7,948,508.

(30) Foreign Application Priority Data

Feb. 28, 2005 (JP) ................................ 2005-053898

(51) Int. Cl.
B41J 2/385 (2006.01)
(52) U.S. Cl. ...................................................... 347/117
(58) Field of Classification Search .................. 347/117; 399/111, 361; 358/296
See application file for complete search history.

(56) References Cited

U.S. PATENT DOCUMENTS

| 4,585,329 | A | 4/1986 | Landa |
| 5,061,961 | A | 10/1991 | Jacobs et al. |
| 5,200,781 | A | 4/1993 | Hata |
| 5,323,210 | A | 6/1994 | Inomata |
| 5,631,690 | A | 5/1997 | Tashiro et al. |
| 5,741,080 | A | 4/1998 | Tomoda et al. |
| 5,812,180 | A | 9/1998 | Masuda et al. |
| 6,494,631 | B1 | 12/2002 | Mastinick |
| 6,997,628 | B2 | 2/2006 | Tu |
| 7,162,182 | B2 | 1/2007 | Tonges et al. |
| 7,336,916 | B2 * | 2/2008 | Jung et al. ...................... 399/111 |
| 7,948,508 | B2 * | 5/2011 | Fukuda ........................ 347/117 |

FOREIGN PATENT DOCUMENTS

| JP | 05-281800 A | 10/1993 |
| JP | 05281800 | * 10/1993 |
| JP | 06-130742 A | 5/1994 |
| JP | 08-054817 A | 2/1996 |

* cited by examiner

Primary Examiner — Stephen Meier
Assistant Examiner — Carlos A Martinez
(74) Attorney, Agent, or Firm — Panitch Schwarze Belisario & Nadel LLP

(57) ABSTRACT

An image recording apparatus includes an image forming section, a first frame for supporting the imager forming section, a second frame for supporting the first frame loosely, and a supporting section disposed on an apparatus body for supporting the second frame in a rotatable manner, wherein the first frame moves in association with a rotation of the second frame.

15 Claims, 15 Drawing Sheets (A)

IMAGE FORMING APPARATUS HAVING FIRST AND SECOND FRAMES AND A CONNECTING MEMBER COUPLED THERETO FOR FACILITATING MULTIPLE STAGES OF MOVEMENT

CROSS-REFERENCE TO RELATED APPLICATIONS

This application is a Continuation of U.S. application Ser. No. 11/360,282, filed Feb. 23, 2006, currently pending, which was published in the English language on Aug. 31, 2006, under U.S. Publication No. 2006-0193011 A1 and the disclosure of which is incorporated herein by reference.

BRIEF SUMMARY OF THE INVENTION

The present invention relates to an image recording apparatus.

To this end, the image recording apparatus according to the present invention includes an image forming section, a first frame for supporting the image forming section, a second frame for supporting the first frame loosely and a supporting section disposed on an apparatus body for supporting the second frame in a rotatable manner.

According to the invention, the first frame moves in association with the rotation of the second frame.

Here, since the first frame can be moved upward in association with the rotation of the second frame, a task for recovering the paper jamming condition can be simplified.

In the image recording apparatuses such as electrophotographic printers, copying machines, facsimile machines and MFP, more specifically, for example in a color printer, a plural image forming sections are disposed side by side and each image forming section forms a toner image of an individual color such as black, yellow magenta and cyan. Each toner image formed on a surface of a photosensitive drum in each image forming section is transferred sequentially onto a print medium fed by a transfer belt equipped as consumables, resulting in a formation of a color toner image. Then, the print medium on which the color toner image was formed is fed to a fusing device in order for the toner image to be fused on the print medium, resulting in appearing the color image.

FIG. 2 is a perspective view illustrating main sections of conventional printers.

In FIG. 2, 11 denotes an apparatus body including side plates 14 and 15 placed at a front side and a rear side of the printer respectively in a manner facing to each other. 16 denotes an image forming section placed detachably to apparatus body 11. Image forming unit 16 includes frame 18, image forming sections 12Bk, 12Y, 12M and 12C disposed detachably to frame 18 and in parallel with each other, and LED heads which are not shown but disposed next to each of image forming sections 12Bk, 12Y, 12M and 12C. Each of image forming sections 12Bk, 12Y, 12M and 12C has a photosensitive drum, a charging roller, a developing roller, cleaning blade and the like.

Frame 18 includes frame 18a of a square shape and a pair of handles 18b and 18c so formed that the handles stand upright at two sides of frame 18a, such that a user can set frame 18 to apparatus body 11 by holding handles 18b and 18c and can also remove the frame from apparatus body 11.

17 denotes a transfer unit disposed detachably to apparatus body 11 immediately below frame 18. Transfer unit 17 includes a driving roller and a driven roller which are not shown, conveyer belt 20 stretched in a freely driving manner between the driving roller and the driven roller, and transfer rollers, not shown, disposed opposing to each of the photosensitive drums within conveyer belt 20.

Here, when frame 18 and transfer unit 17 are set on apparatus body 11, each photosensitive drum and each transfer roller are press-fit to each other through conveyer belt 20, and therefore, upon rotation of the photosensitive drums and running of conveyer belt 20, a print medium which is not shown here is conveyed by conveyer belt 20. During which time, toner images of individual colors formed by each of image forming sections 12Bk, 12Y, 12M and 12C are transferred onto the print medium by the transfer roller piece by piece.

In the printer having the above stated construction, when paper-jamming occurs while the print medium is conveyed along each of image forming sections 12Bk, 12Y, 12M and 12C, the user is required to open a cover of the printer, pick up frame 18 by holding handles 18b and 18c and move the frame outside apparatus body 11 in order to remove the print medium jammed in apparatus body 11 to thereby recover the paper-jamming condition. See the Japanese Patent Laying-Open Publication No. 08-54817.

However, each of image forming sections 12Bk, 12Y, 12M and 12C according to the conventional printer is heavy in weight, such that there is a troublesome in recovering the paper-jamming condition since there is a difficulty in picking up frame 18 as well as an extra space is required outside apparatus body 11 for temporarily placing frame 18.

In view of the problems described above, a purpose of the present invention is to provide an image recording apparatus capable of simplifying a task to recover paper-jamming condition, resolving the problems of the conventional printer.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

This invention may take physical form in certain parts and arrangements of parts, a preferred embodiment and method of which will be described in detail in this specification and illustrated in the accompanying drawings which form a part hereof, and wherein in the drawings.

DETAILED DESCRIPTION OF THE INVENTION

The present invention is hereinafter explained into details by means of embodiments, referring to drawing. Here, a color printer is exemplified among the image recording apparatuses.

Figure 3:
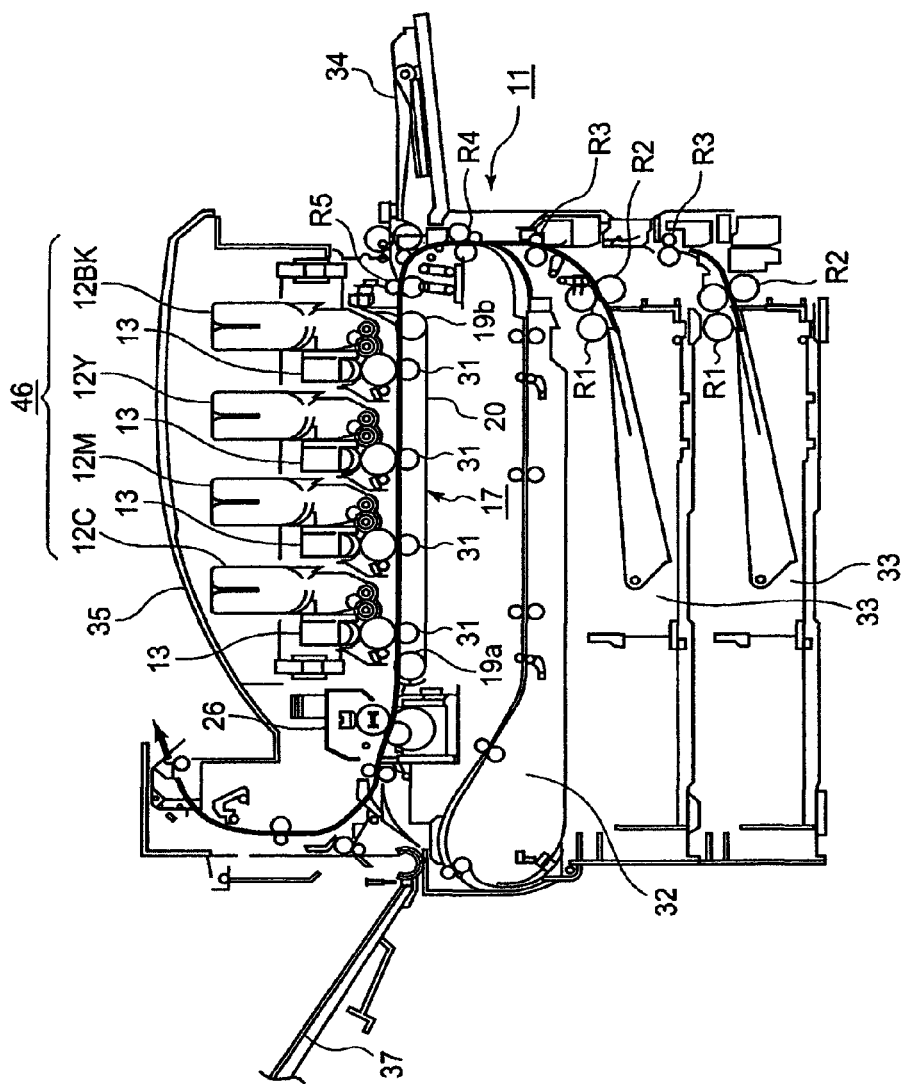
FIG. 3 is a schematic view of a printer according to the first embodiment of the present invention.

FIG. 3 is the schematic view of the printer according to the first embodiment of the present invention.

In FIG. 3, 11 denotes apparatus body 11 carrying image forming unit 46 therein, and image forming unit 46 includes image forming sections 12Bk, 12Y, 12M and 12C disposed side by side along a conveyer path for conveying the print medium as a medium, not shown, and LED heads 13 serving as exposure devices each disposed adjacent to each of image forming sections 12Bk, 12Y, 12M and 12C. Each of image forming sections 12Bk, 12Y, 12M and 12C, having a photosensitive drum as an image carrier, a charging roller as a charging device, a developing roller as a developer carrier, a cleaning blade as a cleaning device and the like, forms a toner image as a developing image of the individual color.

Below image forming unit 46 is disposed transfer unit 17 for conveying a print medium and for transferring the toner images of the individual colors onto the print medium, and is formed with the conveyer path between each of image forming sections 12Bk, 12Y, 12M and 12C and transfer unit 17. Transfer unit 17 includes driving roller 19a, driven roller 19b, conveyer belt 20 as a conveyer member stretched between driving roller 19a and driven roller 19b in a running-free manner and transfer rollers 31 disposed opposing to each of the photosensitive drums within conveyer belt 20.

Downstream of transfer unit 17 in a direction of conveying the print medium is disposed fusing unit 26 for fusing the transferred toner images onto the print medium to form a color image.

Disposed are reverse unit 32 for reversing the print medium when performing a double-sided printing downstream of transfer unit 17 within apparatus body 11, tray 33 as a first print media stacker for setting print media downstream of reverse unit 32, manual paper feed tray 34 as a second print media stacker for feeding relatively small amount of print media on a right side surface of apparatus body 11, stacker 37 for stacking print media after color images having been formed thereonto on a left side surface of apparatus body 11, and stacker 35 for stacking print media having been discharged.

To feed the print medium from tray 33, a signal instructing a print activation is sent from a host computer in order to have feeding roller R1 disposed in the vicinity of tray 33 feed the print medium stacked in tray 33 sheet by sheet. Then, the fed print medium is sent to transfer unit 17 by conveyer rollers R2, R3 and R4 and resist roller R5, absorbed by conveyer belt 20 of transfer unit 17 and conveyed according to the running of conveyer belt 20.

The photosensitive drums disposed in image forming sections 12Bk, 12Y, 12M and 12C contact conveyer belt 20, respectively. Accordingly, the print medium to be absorbed and conveyed by conveyer belt 20 is conveyed while a surface of the print medium contacts each of the photosensitive drums. At the time, each of the toner images of the individual colors formed on each photosensitive drum is transferred onto the print medium through each transfer roller 31.

The print medium, on which the color toner image is formed in such a manner that the toner images of the individual colors are superimposed one after another, is transferred to fusing unit 26 in which the toner images are fused to form the color image.

When the paper-jamming occurs while the print medium is conveyed along each of image forming sections 12Bk, 12Y, 12M and 12C, the user is required to open the cover of the printer, pick up image forming unit 46, remove the jammed print medium remaining within apparatus body 11 to recover the paper-jamming condition. To recover the paper jamming condition, the moving mechanism is employed, such that image forming unit 46 is disposed in a freely movable manner with regard to apparatus body 11. The cover is disposed rotatably in a conveying direction of the print medium.

Figure 1:
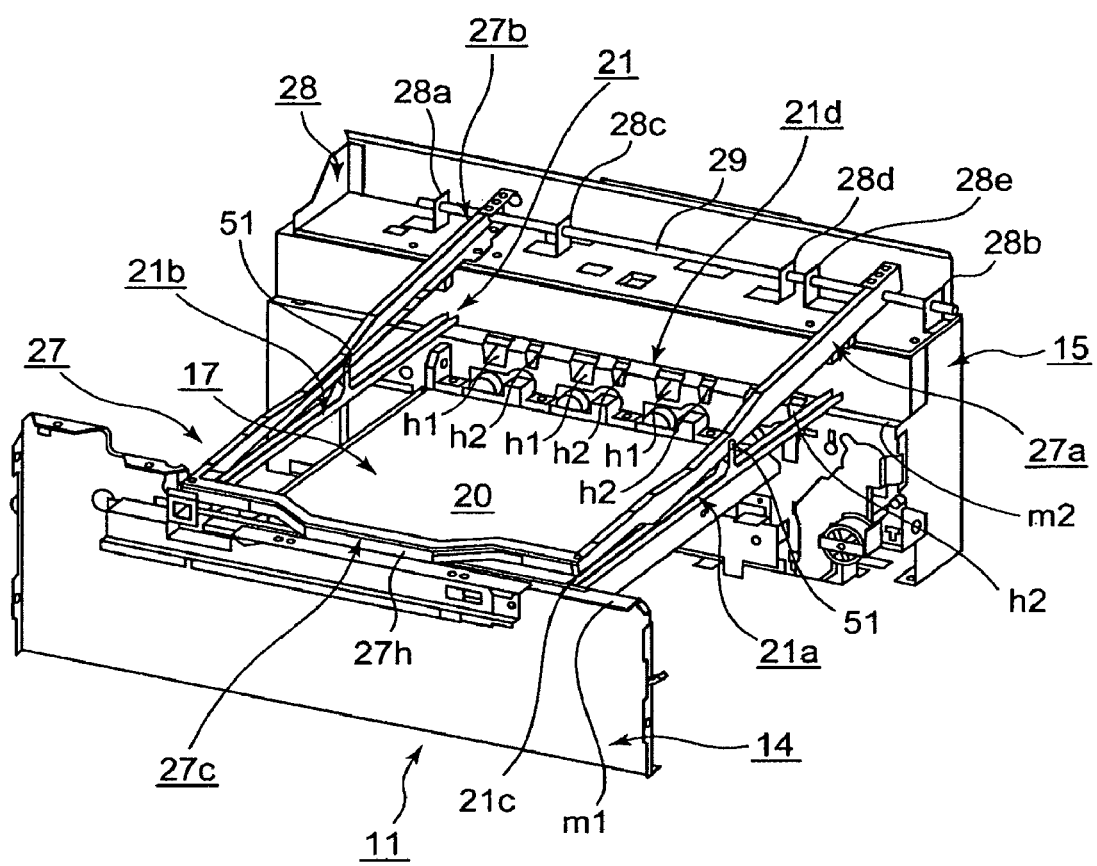
FIG. 1 is a perspective view illustrating a first status of a moving mechanism according to a first embodiment of the present invention.
Figure 2:
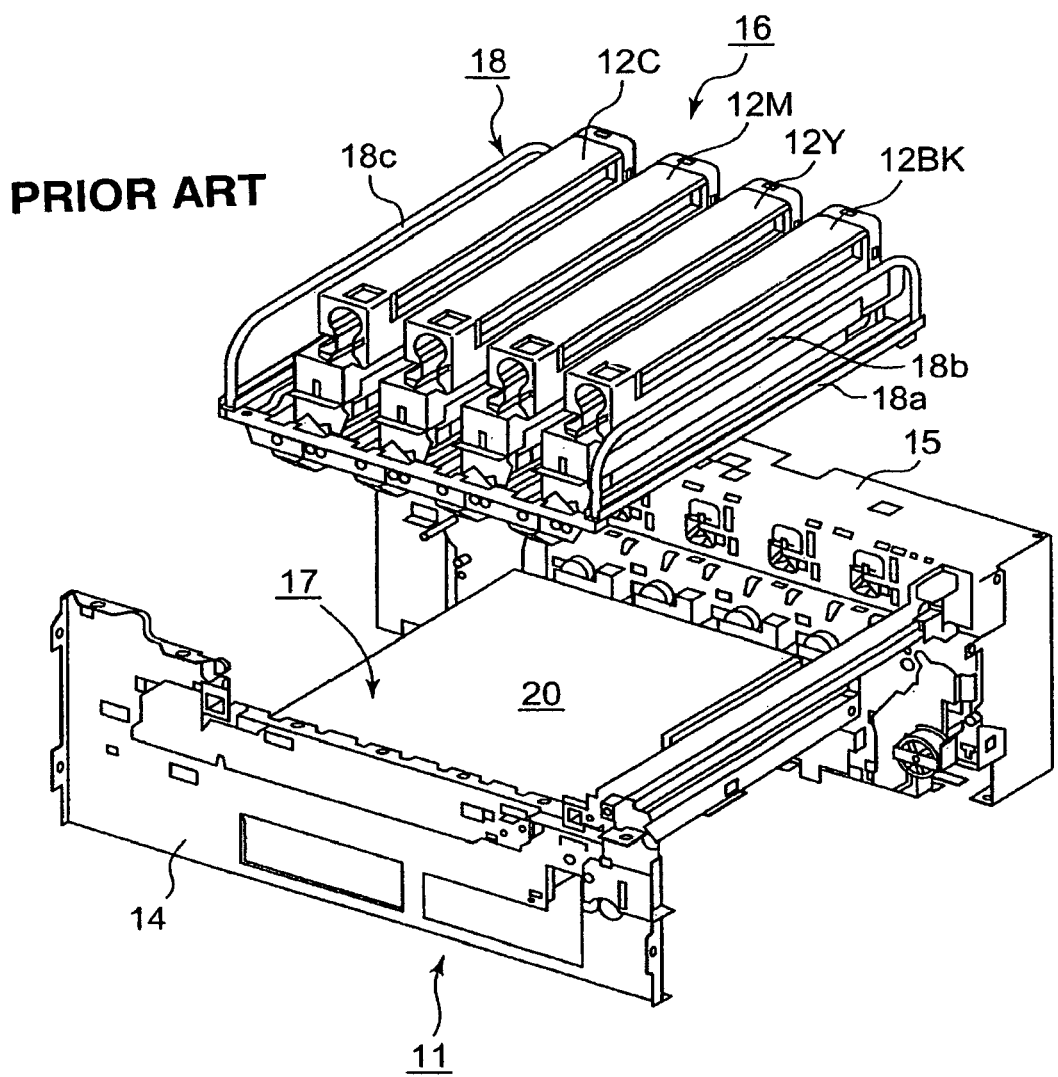
FIG. 2 is a perspective view illustrating a main portion of the conventional printer.
Figure 4:
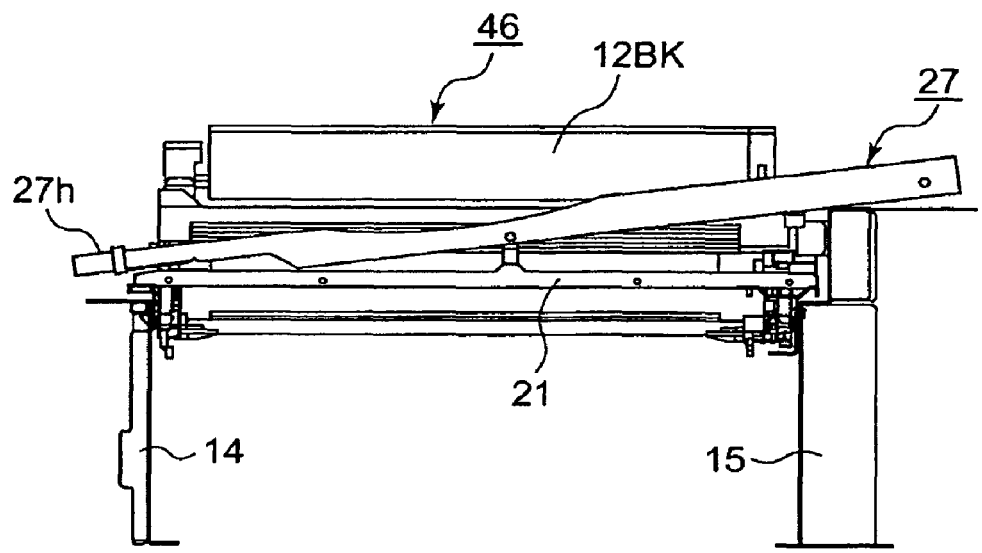
FIG. 4 is a side view illustrating the first status of the moving mechanism according to the first embodiment of the present invention.
Figure 5:
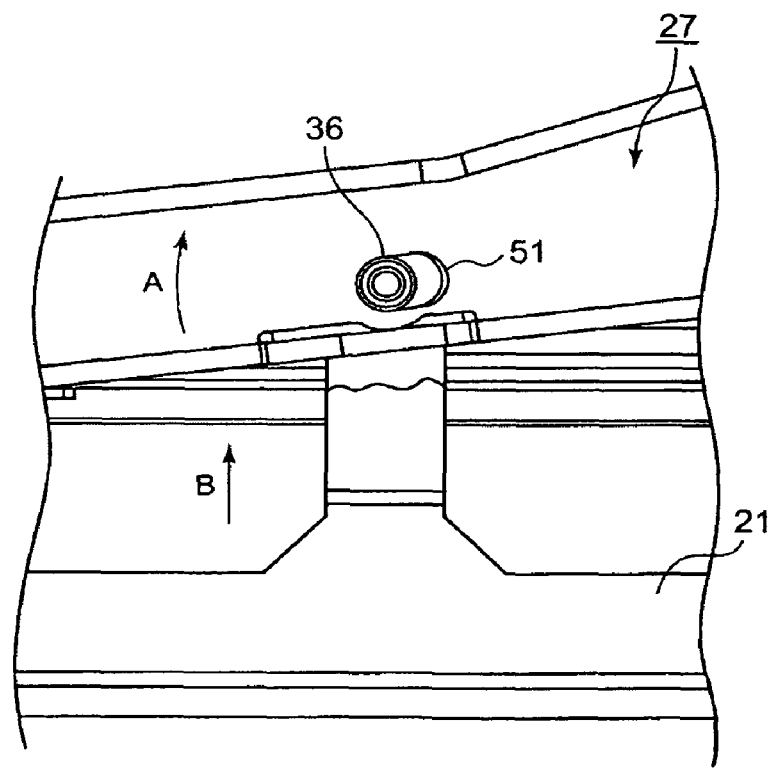
FIG. 5 is an enlarged view illustrating the first status of the moving mechanism according to the first embodiment of the present invention.
Figure 6:
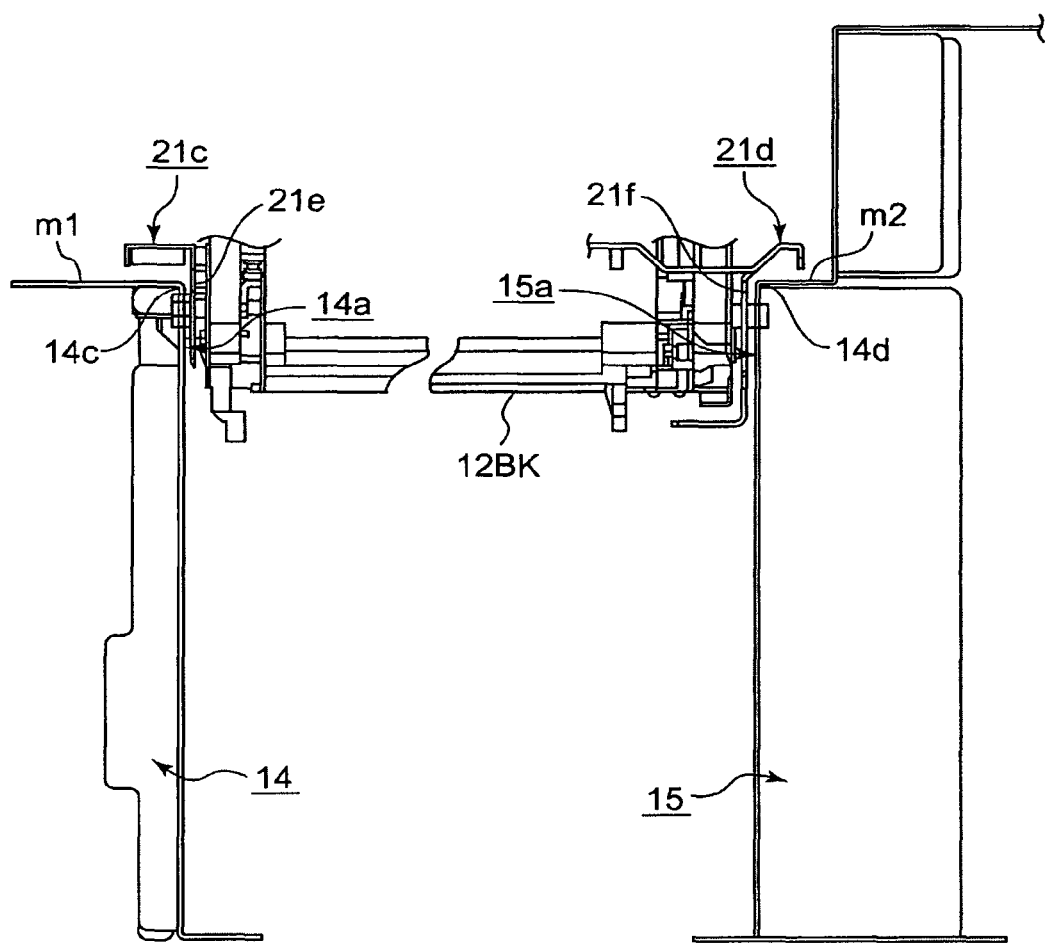
FIG. 6 illustrates a status of an image forming section according to the first embodiment of the present invention.
Figure 7:
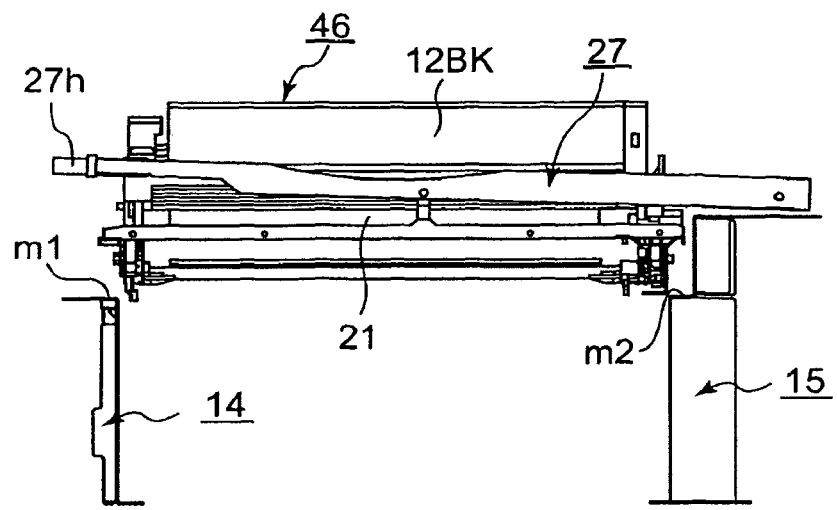
FIG. 7 is a side view illustrating a second status of the moving mechanism according to the first embodiment of the present invention.
Figure 8:
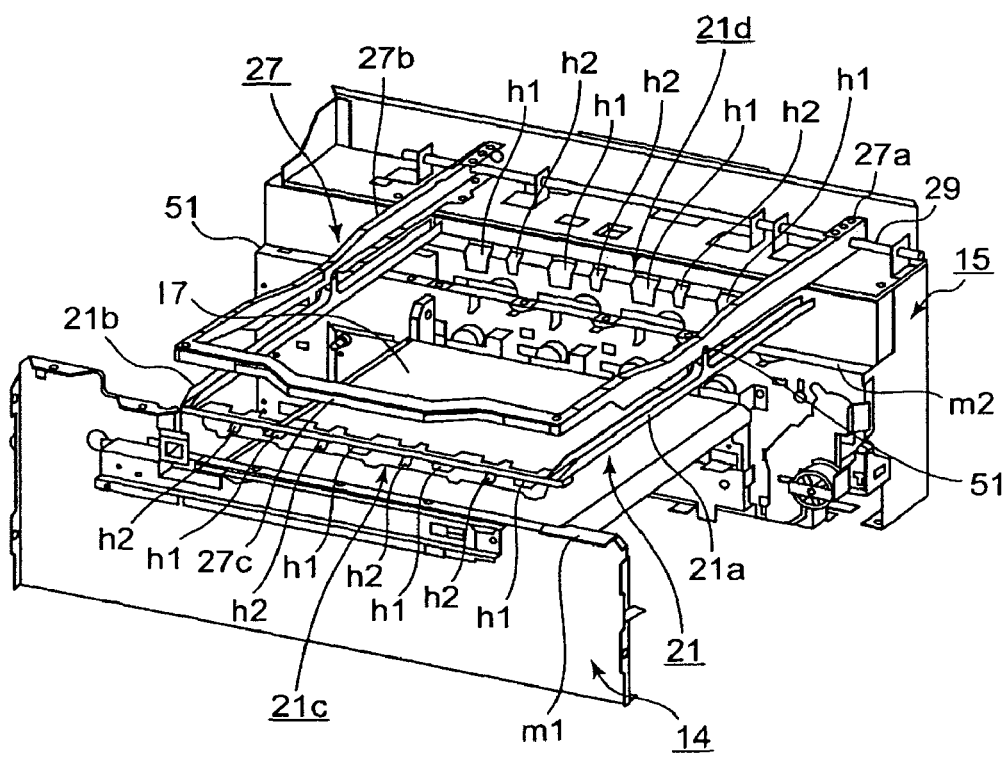
FIG. 8 is a perspective view illustrating the second status of the moving mechanism according to the first embodiment of the present invention.
Figure 9:
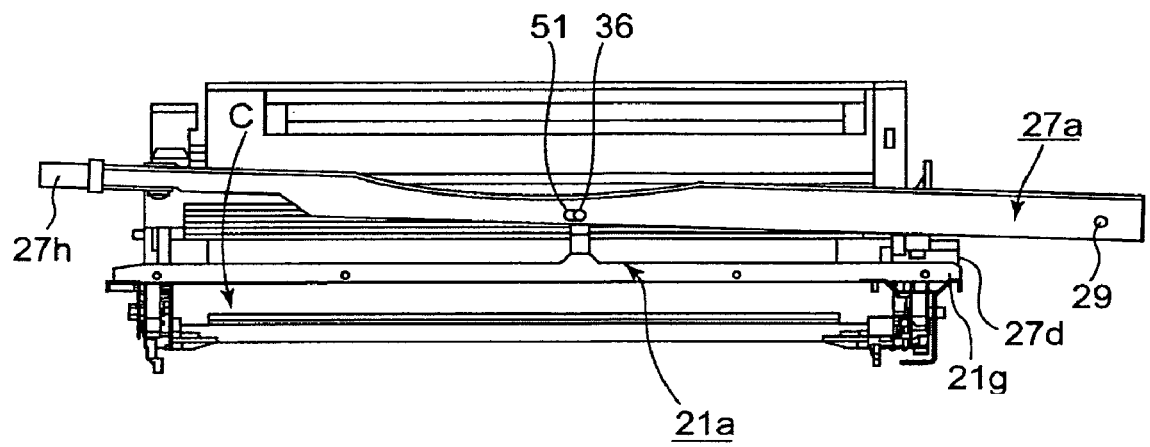
FIG. 9 illustrates a relationship between the moving mechanism and the image forming section according to the first embodiment of the present invention.
Figure 10:
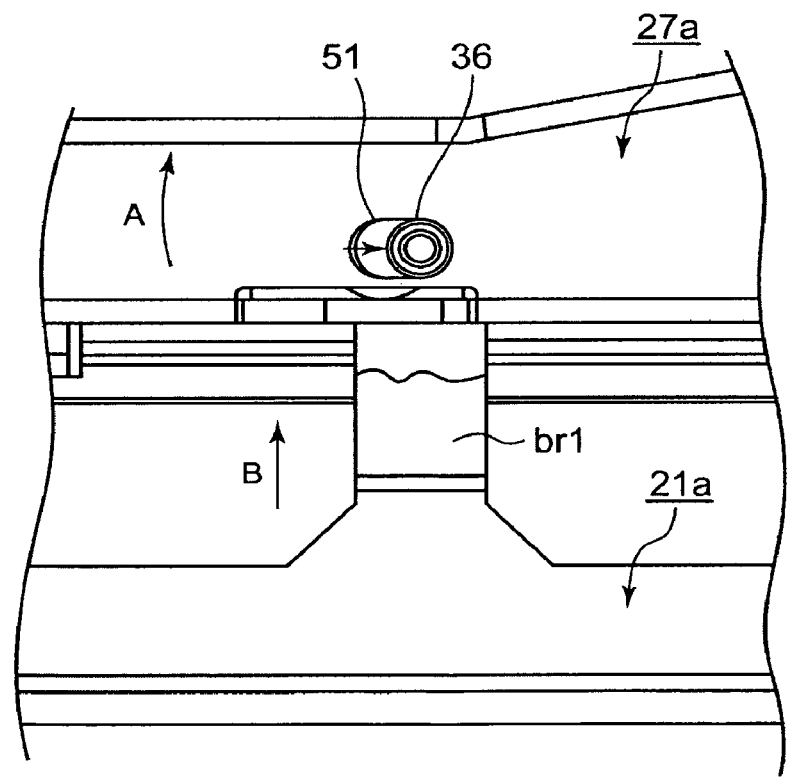
FIG. 10 is an enlarged view illustrating the second status of the moving mechanism according to the first embodiment of the present invention.
Figure 11:
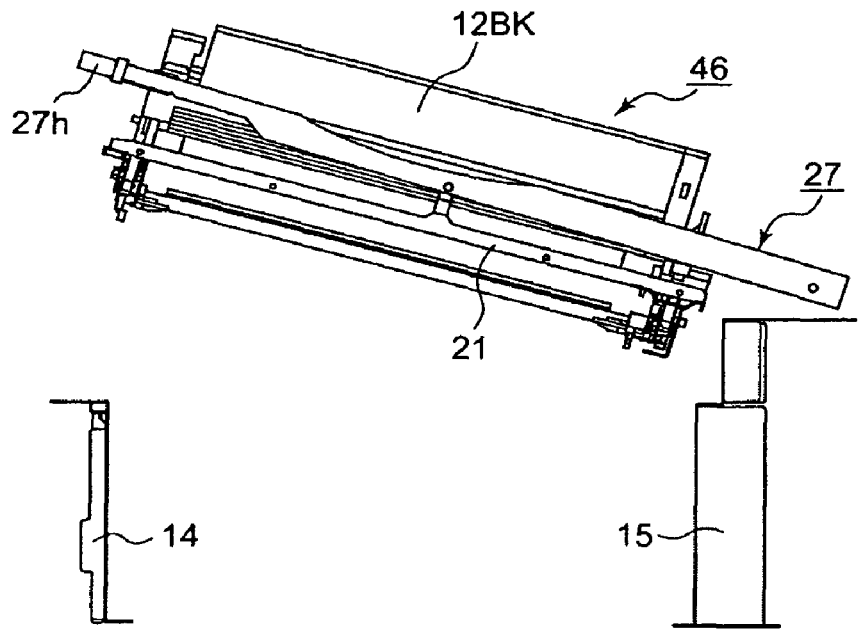
FIG. 11 is a side view illustrating a third status of the moving mechanism according to the first embodiment of the present invention.
Figure 12:
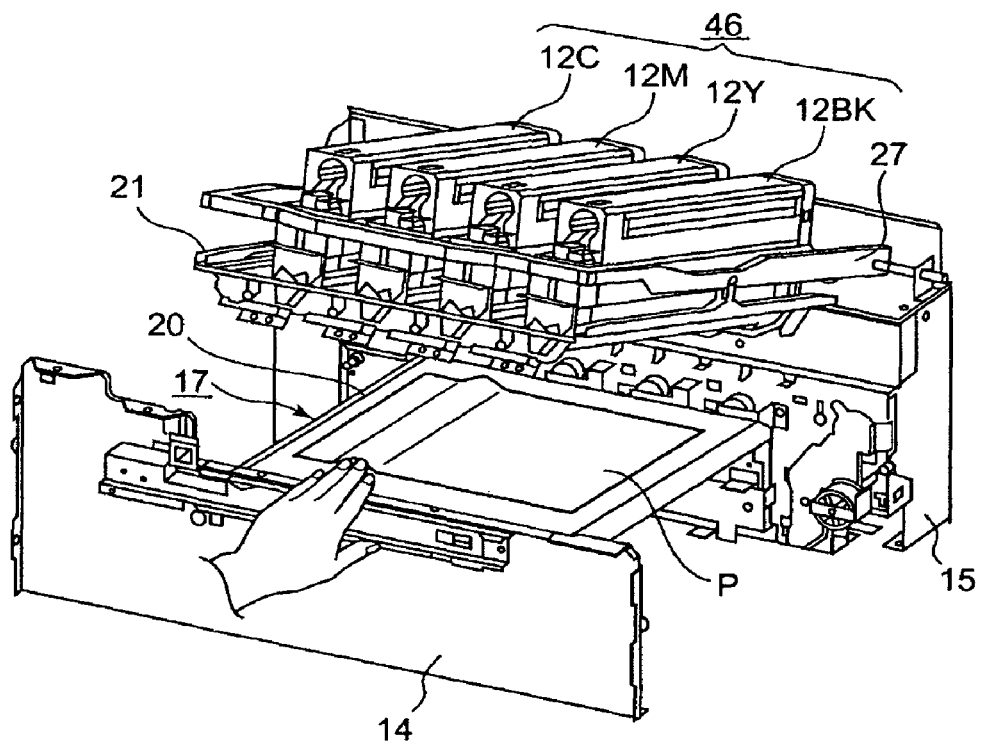
FIG. 12 is a perspective view of the third status of the moving mechanism according to the first embodiment of the present invention.

FIG. 1 is a perspective view illustrating a first status of a moving mechanism according to a first embodiment of the present invention; FIG. 4 is a side view illustrating the first status of the moving mechanism according to the first embodiment of the present invention; FIG. 5 is a enlarged view illustrating the first status of the moving mechanism according to the first embodiment of the present invention; FIG. 6 illustrates a status of an image forming section according to the first embodiment of the present invention; FIG. 7 is a side view illustrating a second status of the moving mechanism according to the first embodiment of the present invention; FIG. 8 is a perspective view illustrating the second status of the moving mechanism according to the first embodiment of the present invention; FIG. 9 illustrates a relationship between the moving mechanism and the image forming section according to the first embodiment of the present invention; FIG. 10 is an enlarged view illustrating the second status of the moving mechanism according to the first embodiment of the present invention; FIG. 11 is a side view illustrating a third status of the moving mechanism according to the first embodiment of the present invention; and FIG. 12 is a perspective view of the third status of the moving mechanism according to the first embodiment of the present invention.

In the drawings, 11 denotes the apparatus body having side plates 14 and 15 which are disposed opposing to each other in the front side and the rear side of the printer, respectively. First retaining section m1 is formed with the upper end of side plate 14 and second retaining section m2 is formed with side plate 15 at the same height as first retaining section m1, the height be lower than the upper end of side plate 14.

21 denotes a first frame of square shape disposed movably in an up and down direction with regard to apparatus body 11. First frame 21 has frame members 21a and 21b disposed in parallel with each other in such a manner extending between side plates 14 and 15 and frame members 21c and 21d disposed in parallel with side plates 14, 15 in such a manner extending between both ends of frame members 21a and 21b, in which image forming unit 46 is disposed detachably in a space enclosed by frame members 21a, 21b, 21c and 21d.

First frame 21 is formed so as to receive image forming unit 46, and therefore frame members 21c and 21d include suspended portions 21e and 21f extending downwardly from the inner sides of side plates 14 and 15, the suspended portions including, and are formed with four holes h1 and h2 at predetermined positions of suspended portions 21e and 21f from the upper end of the side plates in order to set each of image forming sections 12Bk, 12Y, 12M and 12C. Consequently, each of image forming sections 12Bk, 12Y, 12M and 12C extends between frame members 21c and 21d.

27 denotes the second frame of a channel shape disposed loosely with regard to apparatus body 11. Second frame 27 has frame members 27a and 17b disposed in parallel to each other, and frame member 27c disposed in parallel with side plate 14 and extending between the front ends of side plates 14. At a center of frame member 27c, handle 27h is formed in a forwardly projecting manner in order to allow the user to hold second frame 27.

28 denotes a base plate as a base material section attached to the upper end of side plate 15. Base plate 28 is so formed that a plurality of supporting portions 28a, 28b, 28c, 28d and 28e are cut to stand upright and each of the supporting portions are formed with holes. 29 denotes a shaft for supporting second frame 27 on base plate 28 loosely. Shaft 28 is disposed in such a manner in parallel with side plate 15 at a predetermined height, and extending to pass through holes of supporting sections 28a, 28b, 28c, 28d and 28e so as to be supported by supporting sections 28a, 28b, 28c, 28d and 28e in the rotatable manner. Holes are formed in the vicinity of the rear ends of frame members 27a and 27b, through which shaft 29 extends. As such, second frame 27 is supported loosely with regard to apparatus body 11, with the holes of supporting sections 28a, 28b, 28c, 28d and 28e being as centers of oscillation. The moving mechanism is composed of first frame 21, second frame 27 and base plate 28.

Oval holes 51 as oblong holes are formed in approximately centers of frame members 27a and 28b at a position closer to shaft 29 than a barycentric position of image forming unit 46. Inserted into oval holes 51 is post 36 as an axis body formed approximately center of frame members 21a and 21b. To this end, fitting section br1 is formed at approximately center of frame members 21a and 21b in an upright manner and post 36 is formed on an upper end of fitting section br1. As a result, first frame 21 is supported loosely, with post 36 being as the center of oscillation with regard to second frame 27 and in a movable manner toward a side of side plate 14 or a side of side plate 15 in association with the movement of post 36 in oval holes 51. Oval holes 51 take roll of limiters for limiting the movement of post 36.

Next, required steps to recover the paper jamming condition when it occurs are explained hereinbelow.

Firstly, while printing onto the print medium, the moving mechanism is held in the first status as shown in FIGS. 1 and 4-6, namely, first frame 21 is in a horizontal position while second frame 27 is declined. At the same time, post 36 positions at a front side of the printer within oval holes 51. Both ends of frame members 21a and 21b are engaged with first and second engaging sections m1 and m2, respectively, and under which condition, each photosensitive drum of each of image forming sections 12Bk, 12Y, 12M and 12C is brought into contact with transfer unit 17.

Side plates 14 and 15 are formed with guiding surfaces 14a and 15a for guiding first frame 21 in such a manner in parallel with and opposing to suspended portions 21e and 21f in order to form small clearances between suspended portion 21e and guiding surface 14a and between suspended portion 21f and guiding surface 15a, respectively.

If, for example, the print media are conveyed sticking together due to electrostatic, namely if a multi-feed occurs, the print media will remain on transfer unit 17 to cause the paper-jamming. In such case, a paper-jamming detection mechanism, not shown, will send a paper-jamming detection signal to a controlling section, not shown, upon detection of the occurrence of the paper-jamming. Printing operation halting means of the controlling section performs a printing operation halting processing and actually halts the printing operation upon reception of the paper-jamming detection signal, resulting in stopping the printer.

At the time, if the user picks up handle 27h attempting to recover the paper-jamming condition, second frame 27, as shown in FIG. 5, is rotated in an arrow A direction.

In view of the above, first frame 21 is apt to rotate in the arrow A direction in association with second frame 27; however, the first frame will be limited for its rotation by guiding surfaces 14a and 15a and will be guided to move in the up and down direction. Therefore, first frame 21 together with image forming unit 46 is sandwiched between side plates 14 and 15, guided by guiding surfaces 14a and 15a, thereby being forced to move upwardly, namely in an arrow B direction, under a condition keeping the horizontal position of the first frame.

When a side of frame member 27c becomes higher in position than a side of shaft 29 in second frame 27, first frame 21 moves toward the side of shaft 29 due to a load of its own and a load of image forming unit 46, such that post 36 is to be positioned in oval holes 51 at the rear side of the printer.

When a lower end of suspended portion 21e is disengaged from upper ends 14c and 14d of guiding surfaces 14a and 15a, a lower end of suspended portion 21f is disengaged from the upper end of guiding surface 15a and the moving mechanism is thereby placed in the second status as shown in FIGS. 7 and 8, first frame 21 is released from the limitation of the rotation by guiding surfaces 14a and 15a to be forced to rotate in an arrow C direction as shown in FIG. 9, with post 36 being as a rotation axis.

Then, when rear ends 21g of frame members 21c and 21d contact limiters 27d formed at positions corresponding to rear ends 21g in the vicinity of the rear end of frame member 27a, first frame 21 is inhibited from its rotation.

If the user further picks up handle 27h, second frame 27, as shown in FIGS. 11 and 12, is forced to further rotate in the arrow A direction in association with first frame 21, resulting in that the moving mechanism is placed in the third status.

Here, a clearance is formed below image forming unit 46 which enables the user to insert his hands without removing first frame 21 from apparatus body 11, and thus the print medium P causing the paper-jamming can be removed from conveyer belt 20 with ease. Consequently, operations to recover the paper-jamming condition can be simplified.

Image forming unit 46 is rotatable in a direction vertical to a conveying direction of the print medium P, namely on a plane surface vertical to the conveying direction of the print medium, such that an angle capable of removing the print medium P can be secured constant regardless of a position where the print medium P stays, as shown in FIG. 12.

Then, a depression of handle 27h by the user places the moving mechanism is placed in the first status from the third status through the second status. Upon transfer from the second position to the first position, first frame 21 is sandwiched between side plates 14 and 15 together with image forming unit 46, guided by guiding surfaces 14a and 15a, and forced to move downwardly in a state keeping the horizontal position.

Figure 20A:
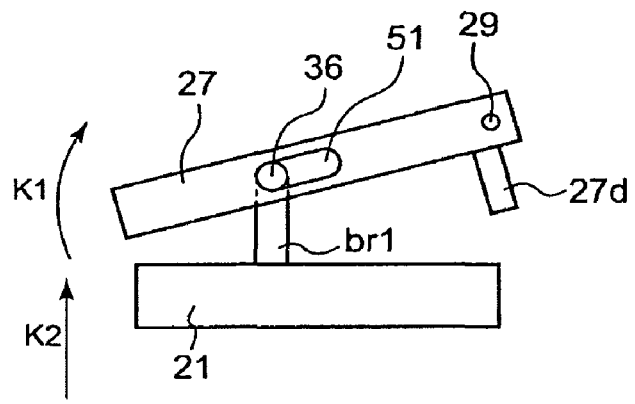
FIGS. 20A, 20B and 20C are side views illustrating opening and closing movements of the moving mechanism according to the first embodiment of the present invention.
Figure 20B:
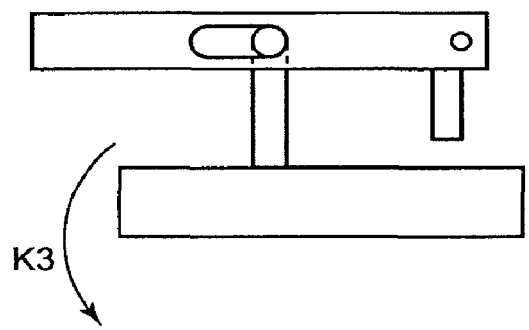
Figure 20C:
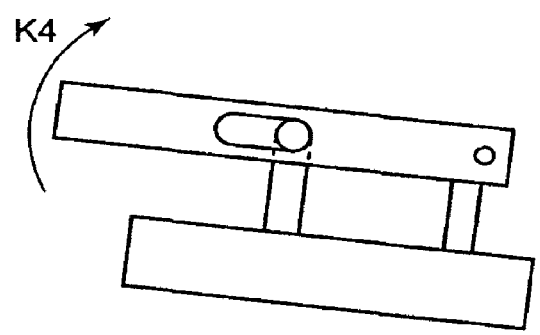

Movement of each mechanical section as stated above in accordance with the present embodiment is summarized hereinbelow. FIGS. 20A, 20B and 20C are perspective views illustrating images of the movements of the mechanical sections one by one according to the present embodiment. Now, assuming that the paper jamming occurs, each of the movements of the mechanical sections is seen in FIGS. 20A, 20B and 20C in this order. Illustrated by dotted lines are reference positions.

Movement from FIG. 20A to FIG. 20B:

20A is a perspective view illustrating a normal condition of the mechanical sections. When the user picks up handles 27h of frame 27, not shown here, upon occurrence of the paper-jamming, frame 27 is forced to rotate in an arrow K1 direction around supporting section 29. On the other hand, frame 21 moves vertically upward in an arrow K2 direction according to the guidance of vertical guiding surfaces, not shown, since frame 21 engages frame 27 through post 36. Image forming unit 46, not shown but being supported by frame 21, moves vertically upward together with frame 21. As moving vertically upward, frame 21 passes through the uppermost ends of the guiding surfaces, rotation limited by the guiding surfaces is released, post 36 within oval holes 51 is positioned at the rear side of the printer to be a status as shown in FIG. 20B. Here, frame 21 rotates around supporting section 29 while the status changes from FIG. 20A to FIG. 20B, whereas frame 27 and the image forming section move upward along the vertical guiding surfaces.

Movement from FIG. 20B to FIG. 20C:

FIG. 20B is a side view illustrating a status in which frame 21 is released from the limitation of the rotation by the guiding surfaces. In the status as shown in FIG. 20B, since frame 21 is released from the limitation of the rotation by the guiding surfaces and a center of the image forming unit resides rather left side of post 36, frame 21 rotates in the arrow K3 direction around post 36 as a rotation axis. When the user further picks up frame 27 in this status, the end of frame 21 contacts limiter 27d of frame 27 to be in a status as shown in FIG. 20C, and therefore the image forming section and frame 21 came to be integral with each other for a rotation. Frame 21, frame 27 and the image forming section are forced to rotate in an arrow N4 direction around supporting section 29, resulting in stopping at a limiter position, not shown. In the above stopped status, the user can remove the printing medium jammed in the apparatus.

Movement from FIG. 20C or later:

Since the end of frame 21 contacts limiter 27d of frame 27 in a status as shown in FIG. 20C, if the user continue to pick up frame 27 further from the status in FIG. 20C, frame 21, frame 27 and the image forming section are forced to rotate in an arrow K4 direction around supporting section 29, resulting in stopping at the limiter position not shown. In the above stopped status, the user can remove the print medium jammed in the apparatus.

In the present embodiment, since an outer peripheral surface of post 36 slides within an inner peripheral surface of oval holes 51 when first frame 21 moves in up and down direction in association with the rotation of second frame 27, a friction load becomes large. To overcome this drawback, the second embodiment of the present invention in which the moving mechanism capable of taking the above first to third statuses smoothly is explained hereinbelow. Components having the same structure as already explained in the first embodiment are omitted for their explanation here but are assigned with the same numerals or symbols. Also, the advantageous results resulting from the components in the present embodiment having the same structure as those in the first embodiment will be referred to those as in the first embodiment.

Figure 13:
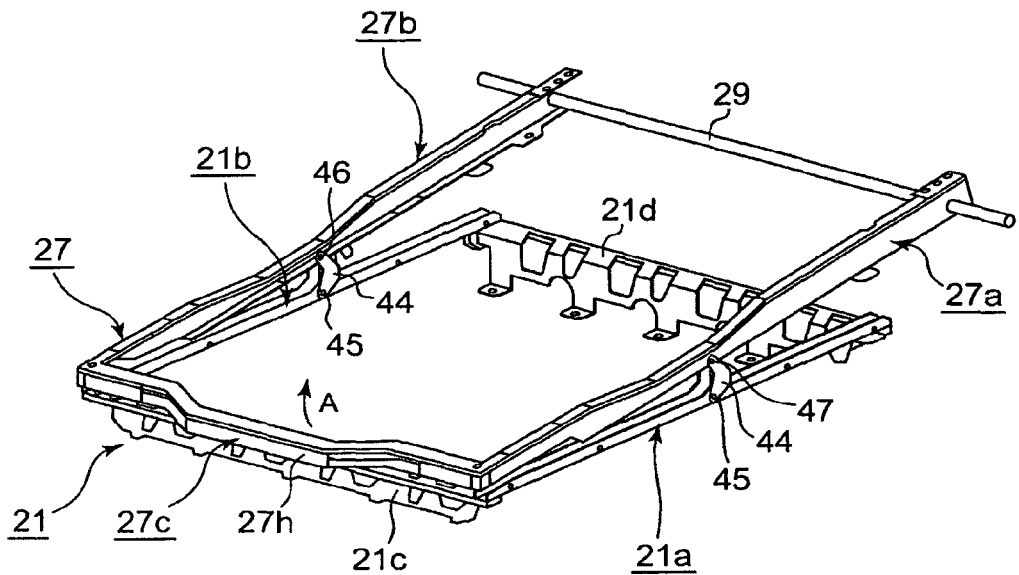
FIG. 13 is a perspective view illustrating the first status of the moving mechanism according to the second embodiment of the present invention.
Figure 14:
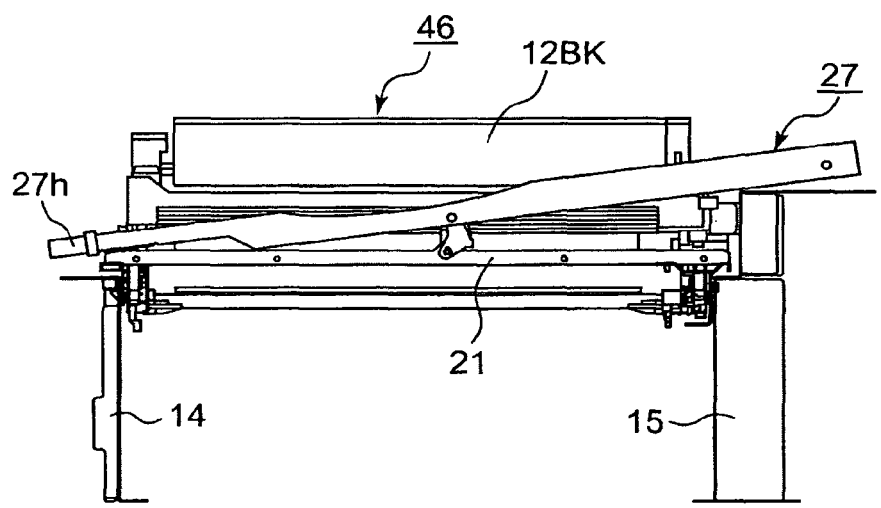
FIG. 14 is a side view illustrating the first status of the moving mechanism according to the second embodiment of the present invention.
Figure 15:
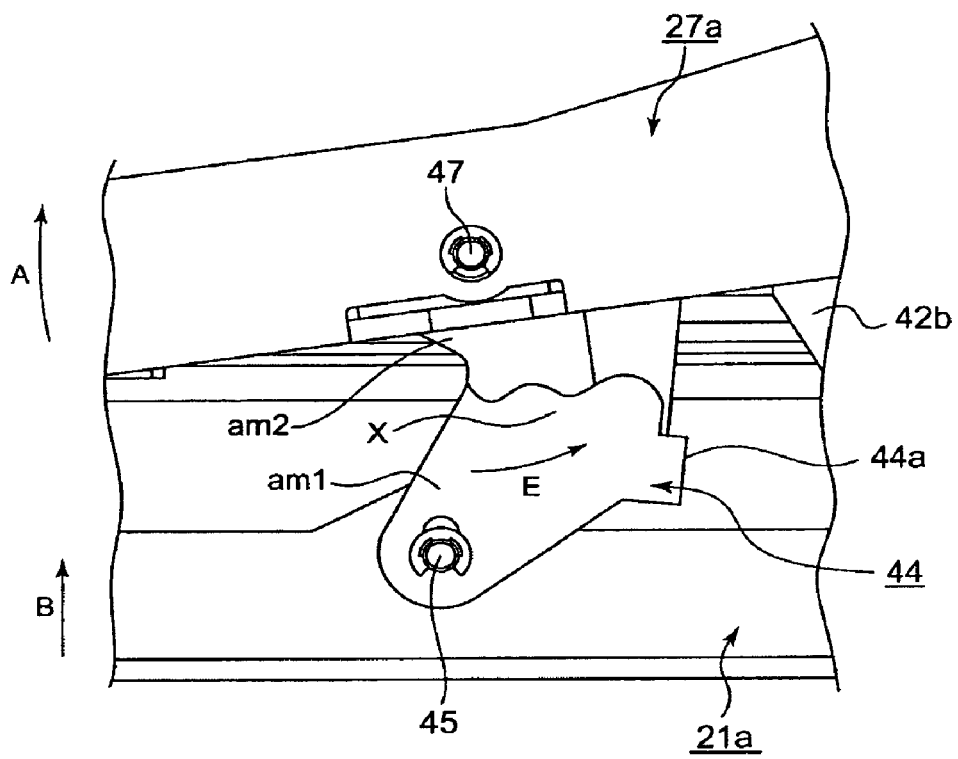
FIG. 15 is an enlarged view illustrating the first status of the moving mechanism according to the second embodiment of the present invention.
Figure 16:
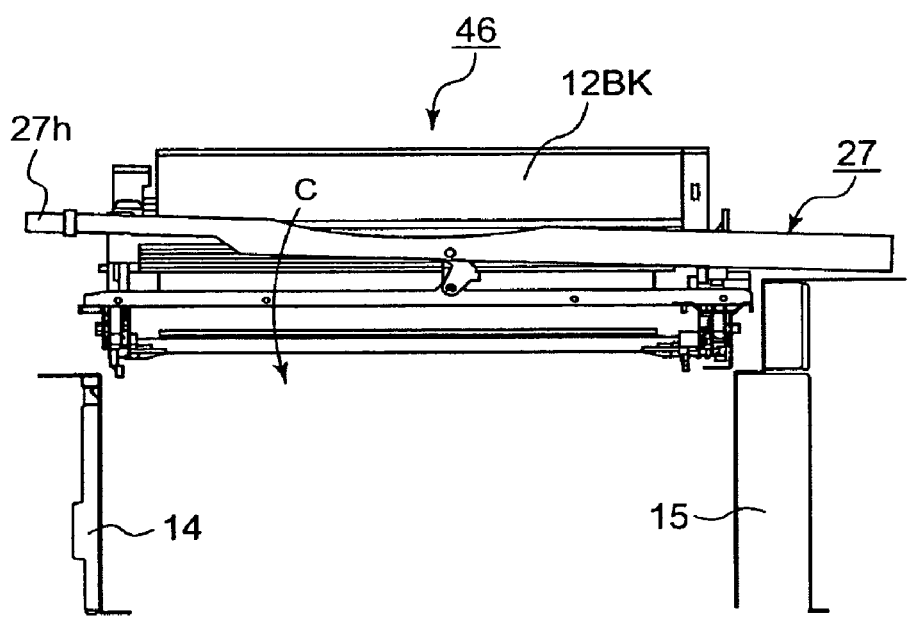
FIG. 16 is a side view illustrating the second status of the moving mechanism according to the second embodiment of the present invention.
Figure 17:
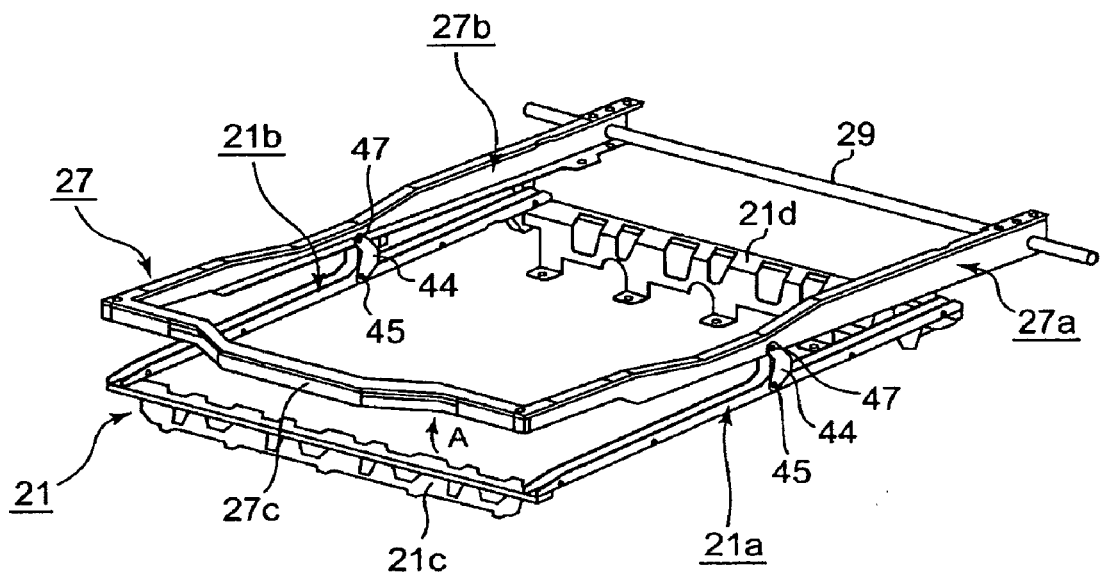
FIG. 17 is a perspective view illustrating the second status of the moving mechanism according to the second embodiment of the present invention.
Figure 18:
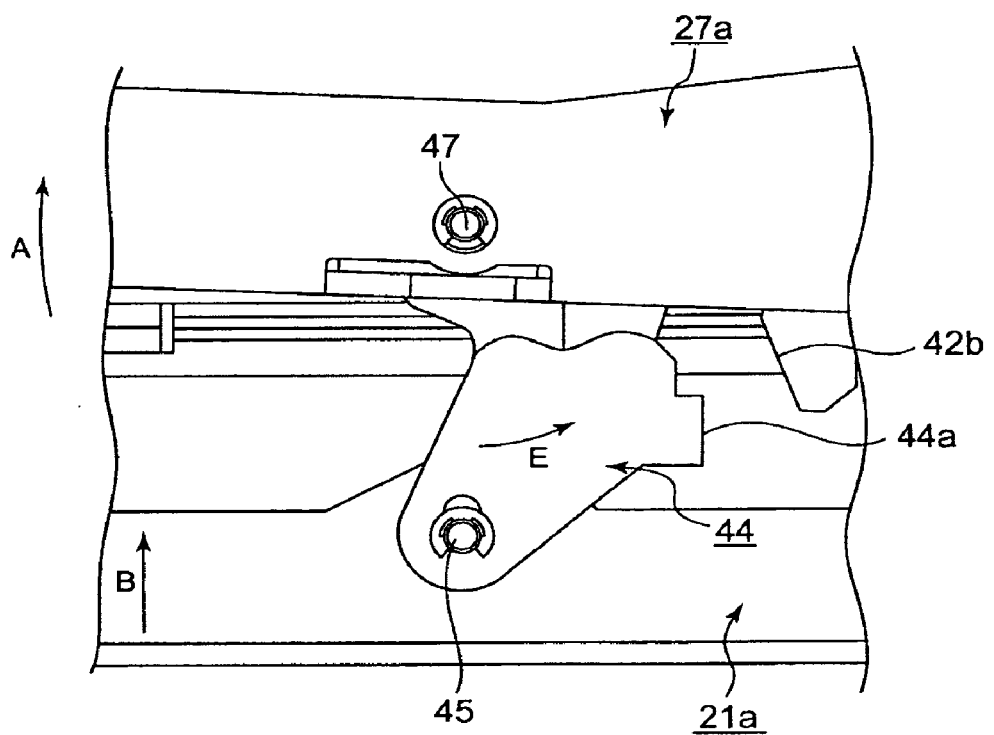
FIG. 18 is an enlarged view illustrating the second status of the moving mechanism according to the second embodiment of the present invention.
Figure 19:
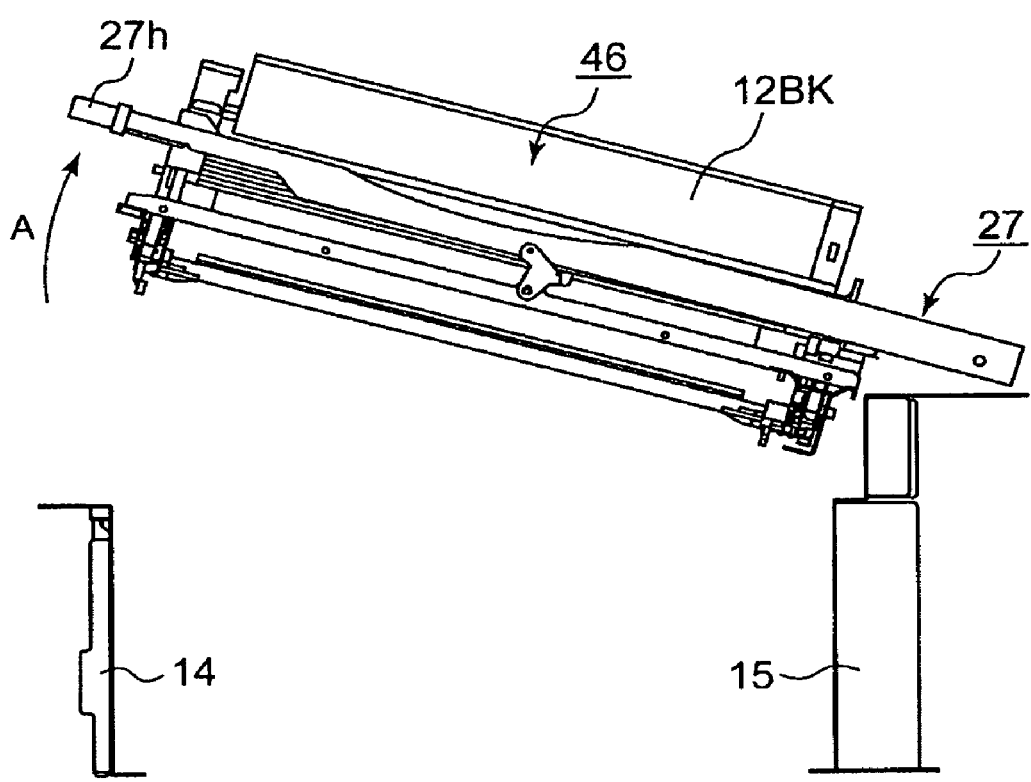
FIG. 19 is a side view illustrating the third status of the moving mechanism according to the second embodiment of the present invention.

FIG. 13 is a perspective view illustrating the first status of the moving mechanism according to the second embodiment of the present invention; FIG. 14 is a side view illustrating the first status of the moving mechanism according to the second embodiment of the present invention; FIG. 15 is an enlarged view illustrating the first status of the moving mechanism according to the second embodiment of the present invention; FIG. 16 is a side view illustrating the second status of the moving mechanism according to the second embodiment of the present invention; FIG. 17 is a perspective view illustrating the second status of the moving mechanism according to the second embodiment of the present invention; FIG. 18 is an enlarged view illustrating the second status of the moving mechanism according to the second embodiment of the present invention; and FIG. 19 is a side view illustrating the third status of the moving mechanism according to the second embodiment of the present invention.

In the illustrated, 45 denotes a post as a first axis formed approximately at the center of frame members 21a and 21b. Post 45 is so formed to project from both surfaces of frame members 21a, 21b by predetermined amounts of projection. 47 denotes a post as a second axis formed at a position closer to shaft 29 than a barycentric position of image forming unit 46. Post 47 is so formed as to project from both sides of frame members 27a, 27b by predetermined amounts of the projection.

44 denotes a link as a connection member having bent portion at a center of the link and first and a second arm sections am1 and am2 which extend from bent portion x toward both ends thereof to finally form a dog-leg shape. Link 44 is disposed such that a valley side of bent portion x faces to side plate 14 and a mountain side of bent portion x faces to side plate 15 and is supported at the both ends by posts 45, 47 loosely. First and second arm sections am1 and am2 of channel shape hold frame members 21a, 21b at first arm section am1 and frame members 27a, 27b at second arm section am2, respectively, from both sides in a clipping manner.

Operation of the printer having the above stated configuration at the time of occurring the paper-jamming is explained hereinbelow.

When the user picks up handles 27h in order to recover the paper-jamming condition in the first status of the moving mechanism, second frame 27 as shown in FIG. 15 is rotated in the arrow A direction, with the holes of supporting sections 28a (FIG. 1), 28b, 28c, 28d and 28e being as the rotation axes.

Following the above rotation, first frame 21 is apt to rotate in the arrow A direction in association with second frame 27; however such rotation is limited by guiding surfaces 14a (FIG. 6) and 15a. Therefore, first frame 21 is sandwiched between side plates 14 and 15 together with image forming unit 46, guided by guiding surfaces 14a, 15a, and moved in the arrow B direction in the status where the first frame is held in the vertical position.

Subsequently, if a height of the side of frame member 27c of second frame 27 becomes larger than that of the side of shaft 29, the lower end of suspended portion 21e is detached from the upper end of guiding surface 14a, the lower end of suspended portion 21f is detached from the upper end of guiding surface 15a, and the moving mechanism is placed to the second status as shown in FIG. 16, first frame 21 will be released from the limitation of the rotation by guiding surfaces 14a, 15a, resulting in allowing first frame 21 to rotate in the arrow C direction around post 45 as the rotation axis.

When rear ends 21g of frame members 21c, 21d contact limiters 27d, first frame 21 is prevented from its rotation. Here, each of links 44 rotates in an arrow E direction as shown in FIGS. 15 and 18, with image forming unit 46 being as the rotation axis. When stop projections 44a formed to project toward side plate 15 at bent portion x contact block projections 42b formed at positions corresponding to those of the stop projections of frame 27a, the rotation of each link 44 stops.

When the user further picks up handles 27h, second frame 27 as shown in FIG. 19 further rotates in the arrow A direction together with first frame 21 to place the moving mechanism in the third status.

When the user depresses handles 27h, the moving mechanism changes of its status from the third status through the second status to the first status. Upon changing the status from the second status to the first status, first frame 21 together with image forming unit 46 are sandwiched between side plates 14 and 15, followed by the guidance by guiding surfaces 14a, 15a and the downward movement in keeping the horizontal position of the first frame.

Summarized are operational conditions of the above stated mechanical sections according to the present embodiment. FIGS. 21A, 21B, 21C and 21D are views illustrating images of the operations of the mechanical sections according to the present embodiment. Hereinbelow, assuming that the paper-jamming occurs, operational conditions of the mechanical sections are explained referring to FIGS. 21A, 21B, 21C and 21D in this order. Shown in dotted lines are reference positions.

Figure 21A:
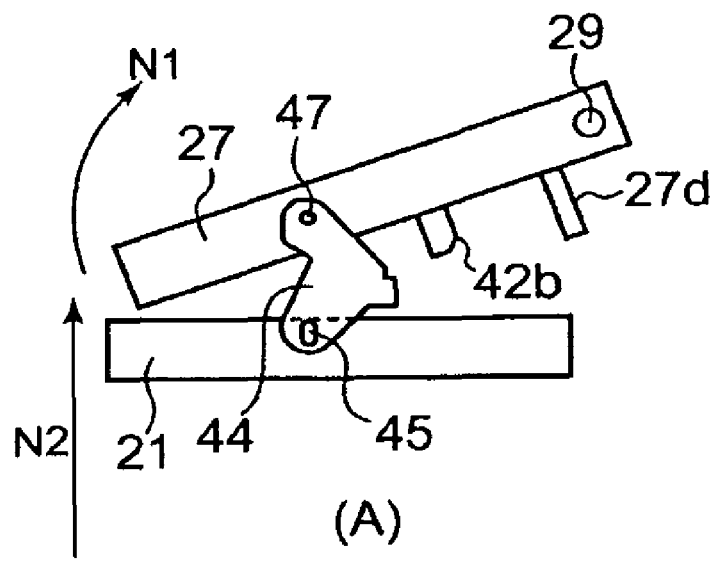
FIGS. 21A, 21B, 21C and 21D are side views illustrating opening and closing movements of the moving mechanism according to the second embodiment of the present invention.
Figure 21B:
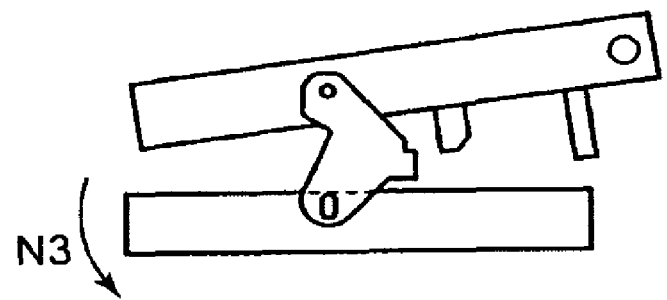

Movement from FIG. 21A to FIG. 21B:

FIG. 21A is a perspective view illustrating a normal condition of the moving mechanism. Upon occurrence of the paper-jamming and the user's sequential picking up of handles 27h, not shown, frame 27 rotates in the arrow N1 direction around supporting section 29. On the other hand, frame 21, as it engages frame 27 through link 44, is guided by vertical guiding surfaces, not shown, to move vertically upward in an arrow N2 direction. Being supported by frame 21, image forming unit 46, not shown, also moves vertically upward together with frame 21. As moving upward, frame 21 passes through the uppermost ends of the guiding surfaces and thus is released from the limitation of the rotation by the guiding surfaces, resulting in being placed in the status as shown in FIG. 21B. Here, in the statuses as shown in FIGS. 21A and 21B, frame 21 rotates around supporting section 29, whereas frame 27 and the image forming section move upward along the vertical guiding surfaces.

Figure 21C:
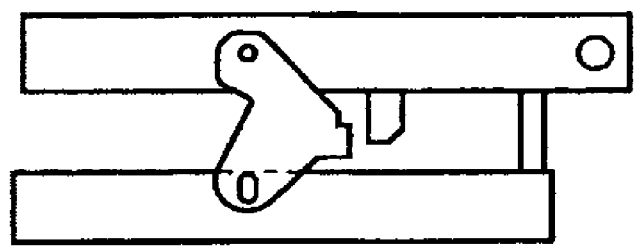

Movement from FIG. 21B to FIG. 21C:

FIG. 21B is a side view illustrating a status in which frame 21 is released from the limitation of the rotation by the guiding surfaces. In FIG. 21B, frame 21 rotates in the arrow N3 direction around post 45 as the rotation axis since frame 21 is released from the limitation of the rotation by the guiding surfaces and the barycentric position of the image forming section resides left side of post 45. When the user picks up frame 27 continuously further from the above mentioned status, the end of frame 21 contacts limiter 27d, resulting in being a status as shown in FIG. 21C to allow the image forming section and frame 21 to rotate in one piece.

Figure 21D:
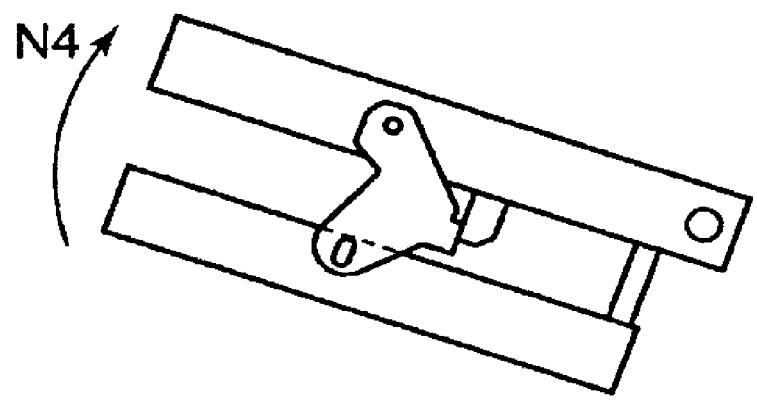

Movement from FIG. 21C to FIG. 21D:

In a status as shown in FIG. 21C, since the end of frame 21 contacts limiter 27d, the bent portion of link 44 is brought into contact with contact portions 42b to be placed in a status as shown in FIG. 21D when the user continuously picks up frame 27 from the status as shown in FIG. 21C.

Movement from FIG. 21D or later:

Since the end of frame 21, in a status as shown in FIG. 21D, contacts limiter 27d of frame 27, and the bent portion of link 44 contacts contact portion 42b of frame 21, frame 21, frame 27 and the image forming section are allowed to rotate in one piece. When the user further picks up frame 27 from the status as shown in FIG. 21D, frame 21, frame 27 and the image forming section rotate in the arrow N4 direction around supporting section 29, resulting in stopping at the position of limiter, not shown here. In the stopped status as described above, the user removes the print medium jammed in the apparatus.

In the present embodiment as stated above, first frame 21 and second frame 27 are connected through links 44, with the links being disposed in an independently loose-fit manner with respect to the first and the second frames 21, 27, and therefore the friction load at the time that first frame 21 moves vertically in association with the rotation of second frame 27 can be minimized.

Consequently, the moving mechanism can be smoothly placed in the first to third statuses.

The image forming section according to the present invention includes the photosensitive drums as the image carriers, the charging roller as the charging section, the development roller as the development section, a cleaning blade as the cleaning device. However, the image forming section of the present invention is not limited to the one as stated above, but may be the one which includes at least one of the image carrier, the charging section, the development section or the cleaning section.

According to the present invention, frame 21 is vertically guided by guiding surfaces; however, can be guided in an oblique direction without being limited to the vertical guidance.

According to the present invention, the color printer has been exemplified as the image forming apparatus; however, monochrome printer is also applicable here. As for the image forming apparatus, not only printer but, as a matter of course, copying machine, facsimile machine, MFP or the like can be utilized.

As described above, it is obvious that this invention can be arbitrarily modified without departing from the scope of this invention.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An image recording apparatus comprising:
   an image forming section;
   a first holding member for holding said image forming section, the first holding member including a first post;
   a second holding member for swingably holding said first holding member, the second holding member including a second post;
   a connecting member for connecting the first holding member and the second holding member, the connecting member including a first arm rotatably coupled to the first post, a second arm rotatably coupled to the second post, and a stop projection; and
   a supporting section disposed on an apparatus body for supporting said second holding member in a rotatable manner,
   wherein said first holding member moves in association with a rotation of said second holding member,
   wherein said first holding member moves in a rotational direction with respect to the supporting section after moving in a substantially straight direction with respect to the supporting section, and
   wherein during movement of the first holding member in a substantially straight direction, the connecting member rotates with respect to the first and second holding members, and during movement of the first holding member in a rotational direction, the stop projection of the connecting member abuts a portion of the second holding member to prevent rotation of the connecting member with respect to the first and second holding members.

2. The image recording apparatus according to claim 1, wherein the first and second arms extend from a bent portion of the connecting member.

3. The image recording apparatus according to claim 1, wherein said supporting section supports the second holding member in the rotatable manner in a direction substantially perpendicular to a conveying direction of a print medium.

4. The image recording apparatus according to claim 3, further comprising a cover supported rotationally in the conveying direction of said print medium.

5. The image recording apparatus according to claim 4, wherein said image forming section comprises at least one of an image carrier, a charging section, a development section or a cleaning section.

6. The image recording apparatus according to claim 3, wherein said image forming section comprises at least one of an image carrier, a charging section, a development section or a cleaning section.

7. The image recording apparatus according to claim 1, wherein the connecting member is swingably supported with respect to the first and the second holding members.

8. The image recording apparatus according to claim 7, wherein said image forming section comprises at least one of an image carrier, a charging section, a development section or a cleaning section.

9. The image recording apparatus according to claim 7, wherein the movement of said first holding member is caused by said second holding member via the connecting member.

10. The image recording apparatus according to claim 1, further comprising a guiding surface section for guiding the first holding member to move in the substantially straight direction.

11. The image recording apparatus according to claim 10, wherein said image forming section comprises at least one of an image carrier, a charging section, a development section or a cleaning section.

12. The image recording apparatus according to claim 1, wherein said image forming section comprises at least one of an image carrier, a charging section, a development section or a cleaning section.

13. The image recording apparatus according to claim 1, wherein the substantially straight direction is a substantially vertical direction.

14. An image forming apparatus comprising the image recording apparatus according to claim 1.

15. The image recording apparatus according to claim 1, wherein said second holding member swingably and slidably holds said first holding member.

* * * * *